United States Patent [19]

Goodlaxson

[11] Patent Number: 4,649,263
[45] Date of Patent: Mar. 10, 1987

[54] HEATING KETTLE

[75] Inventor: John D. Goodlaxson, Colfax, Iowa

[73] Assignee: Goodlaxson Mfg. Inc., Colfax, Iowa

[21] Appl. No.: 809,397

[22] Filed: Dec. 16, 1985

[51] Int. Cl.$^4$ ............................................. F27D 11/02
[52] U.S. Cl. .................................. 219/438; 219/436; 219/463; 219/542
[58] Field of Search ............... 219/438, 536, 537, 542, 219/463, 436; 126/390; 99/323.5

[56] References Cited

U.S. PATENT DOCUMENTS

| | | | |
|---|---|---|---|
| 2,433,750 | 12/1947 | Fisher | 219/289 |
| 2,605,382 | 7/1952 | Kircher et al. | 219/433 |
| 2,798,931 | 7/1957 | Naxon | 219/433 |
| 3,662,155 | 5/1972 | Komazaki | 219/432 |
| 3,892,945 | 7/1975 | Lerner | 219/437 |
| 4,052,590 | 10/1977 | Anderl et al. | 219/438 |
| 4,215,267 | 7/1980 | Kaebitzsch | 219/439 |
| 4,251,713 | 2/1981 | Landfors | 219/275 |
| 4,270,067 | 5/1981 | Thomas et al. | 219/438 |

FOREIGN PATENT DOCUMENTS 611549  6/1931  Fed. Rep. of Germany ...... 219/438

OTHER PUBLICATIONS

Chromalox Industrial Heating Products Stock Catalog, 1980.

Primary Examiner—E. A. Goldberg
Assistant Examiner—Teresa J. Walberg
Attorney, Agent, or Firm—Zarley McKee, Thomte, Voorhees & Sease

[57] ABSTRACT

A heating kettle includes a pot having a bottom wall and a side wall, a heating element adapted to heat the pot, and a hold-down plate for holding the heating element against the bottom wall of the pot. The hold-down plate is secured to both the bottom wall of the pot and to the side wall of the pot by a plurality of fasteners. Such plurality of fasteners securely sandwiches the heating element between the hold down plate and the bottom wall of the pot, thereby minimizing the deformation of the bottom wall of the pot and of the heating element during use of the kettle so as to increase the efficiency of the kettle.

7 Claims, 9 Drawing Figures

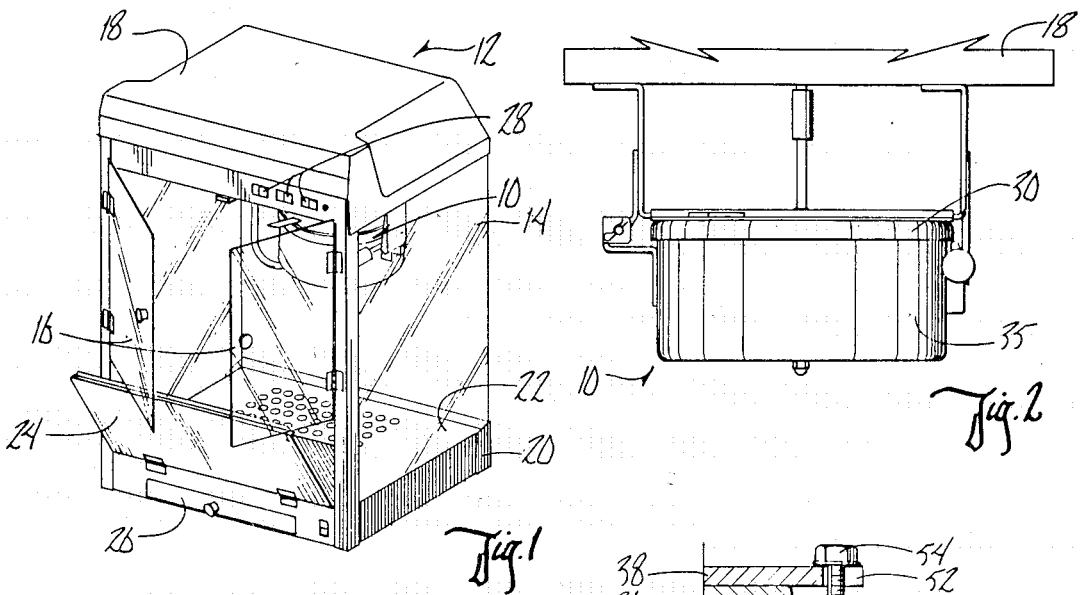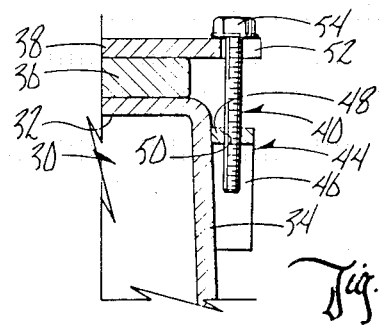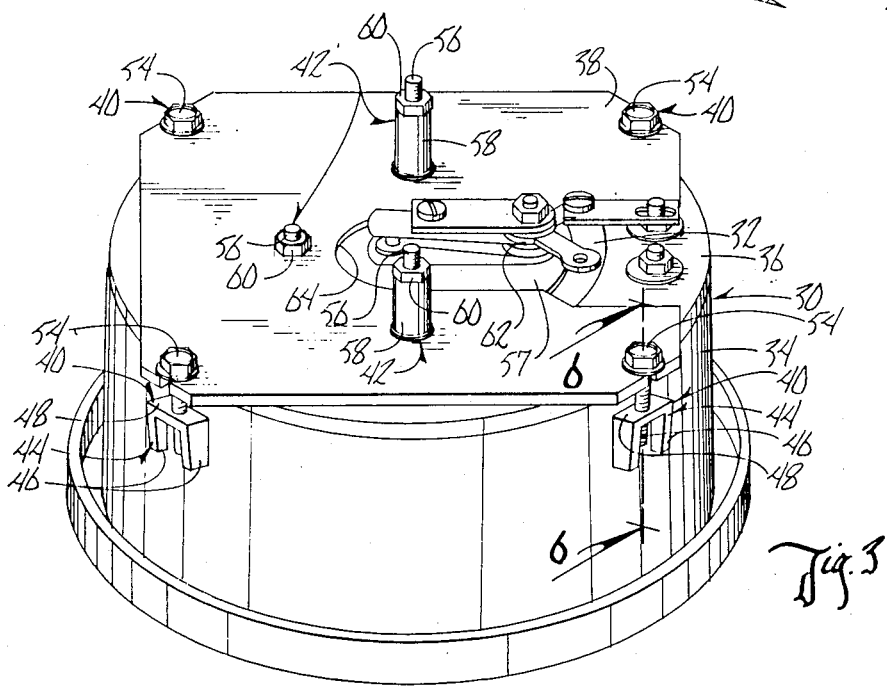

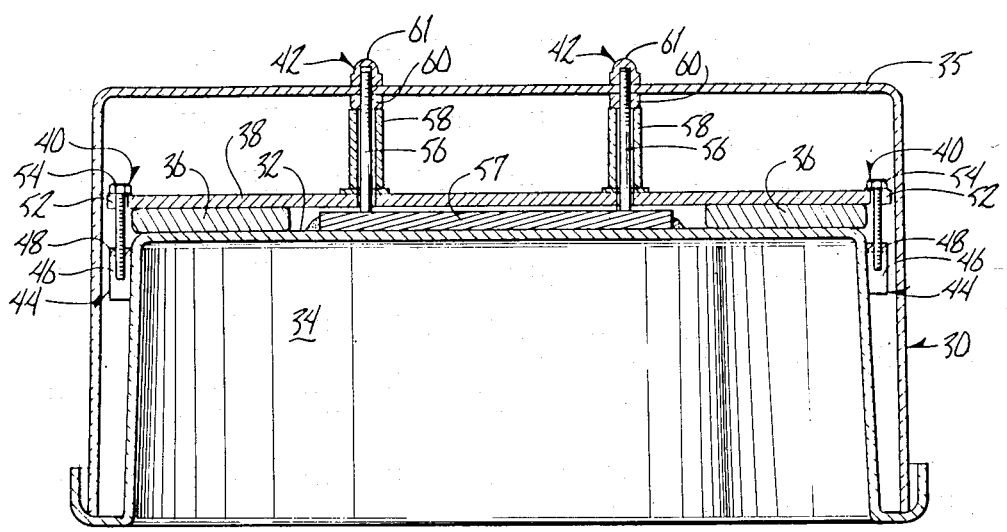
Fig. 7
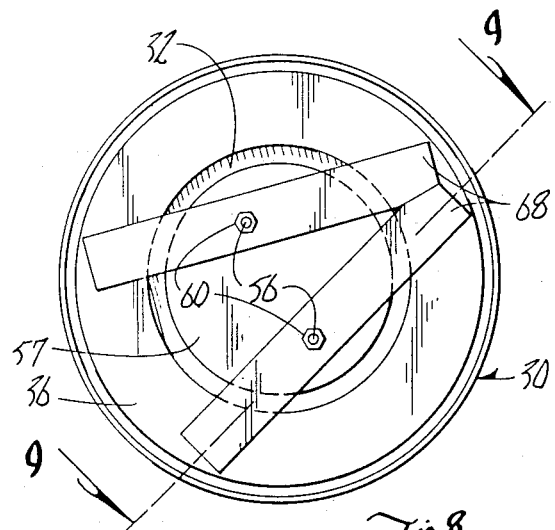
PRIOR ART Fig. 8
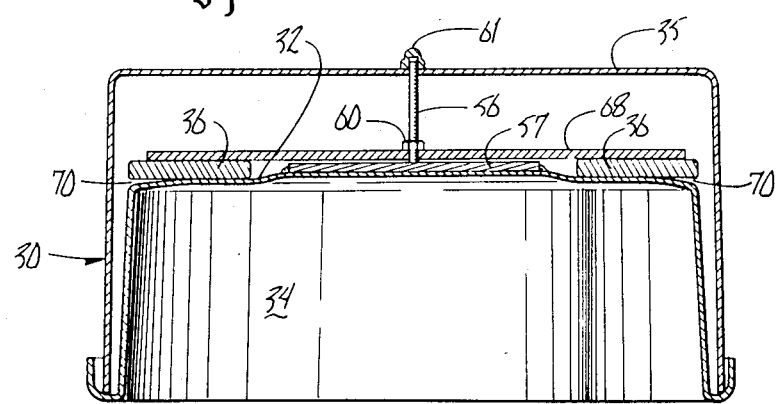
PRIOR ART Fig. 9

HEATING KETTLE

BACKGROUND OF THE INVENTION

Corn popping kettles, and particularly those utilized in corn popping machines having chambers for storing and displaying the popcorn, generally include a pot for holding the pre-popped kernels of corn and a heating element secured to the bottom wall of the pot. In popping corn, it is desirable to heat the kernels as quickly as possible such that the moisture therein is quickly converted to steam thereby causing the kernel to pop or explode. If the kernel is not heated sufficiently quick, the moisture therein tends to seep out of the kernel, thereby inhibiting the popping action of the kernel.

In conventional corn popping kettles, the heating element is typically secured to the bottom wall of the pot by a metal strap extending across the element and secured to the bottom of the pot. A problem exists in these prior art kettles in that as the temperature of the heating element increases, there is a tendency for the element and the bottom of the pot to deform such that gaps exist between the heating element and the bottom wall of the pot. The presence of such gaps decrease the efficiency of the kettle since the transfer of heat from the heating element to the pot is not even across the bottom wall of the pot. Furthermore, such conventional heating kettles have a thermostat for sensing the temperature of the pot and accordingly adjusting the temperature of the heating element. If the temperature of the pot is not up to approximately 475°-520° F., as sensed by the thermostat, the temperature of the heating element is increased to raise the temperature of the pot. However, the deformation gaps between the bottom wall of the pot and the heating element prevent complete heat transfer from the element to the pot, such that the thermostat continually raises the temperature of the heating element without the pot reaching the desired cooking temperature. Thus, it is common for the heating element to become burned out in such conventional heating kettles. Also, the heat may arc over the gap between the heating element and the bottom of the pot and burn a hole through the pot.

Therefore, a primary objective of the present invention is the provision of an improved heating kettle.

A further objective of the present invention is the provision of a corn popping kettle wherein the heating element is held in contact with the bottom wall of the pot.

Another objective of the present invention is the provision of a corn popping kettle having a hold-down plate secured to the side wall of the pot so as to hold the heating element against the bottom wall of the pot.

Still another objective of the present invention is the provision of a corn popping kettle which pops corn quicker and more completely than conventional kettles.

These and other objectives will become apparent from the following description of the present invention.

SUMMARY OF THE PRESENT INVENTION

A heating kettle, preferably for popping corn, is provided and includes a pot having a bottom wall and a side wall. A heating element adapted to heat the pot is held against the bottom wall of the pot by a hold-down plate which is secured to the side wall and bottom wall of the pot. Thus, the heating element is securely sandwiched between the hold-down plate and the bottom wall of the pot. The greater inherent strength of the side walls of the pot, as compared to the bottom wall of the pot, permits the hold-down plate to be tightly clamped to the pot so as to minimize or eliminate deformation of the bottom wall of the pot and of the heating element during use of the kettle. The hold-down plate is metal and substantially covers the heating element and the bottom wall of the pot and extends beyond the side wall of the pot for securement thereto.

BRIEF DESCRIPTION OF THE DRAWINGS

FIG. 1 is a perspective view of a corn popping machine which utilizes the heating kettle of the present invention.

FIG. 2 is a side elevational view of the heating kettle of the present invention.

FIG. 3 is a perspective view of the heating kettle of the present invention turned upside down.

FIG. 6 is a sectional view of the kettle taken along lines 6—6 of FIG. 4.

FIG. 7 is a sectional view taken along lines 7—7 of FIG. 4.

FIG. 8 is a bottom plan view of a prior art heating kettle.

FIG. 9 is a sectional view taken along line 9—9 of FIG. 8.

DETAILED DESCRIPTION OF THE DRAWINGS

Figure 4:
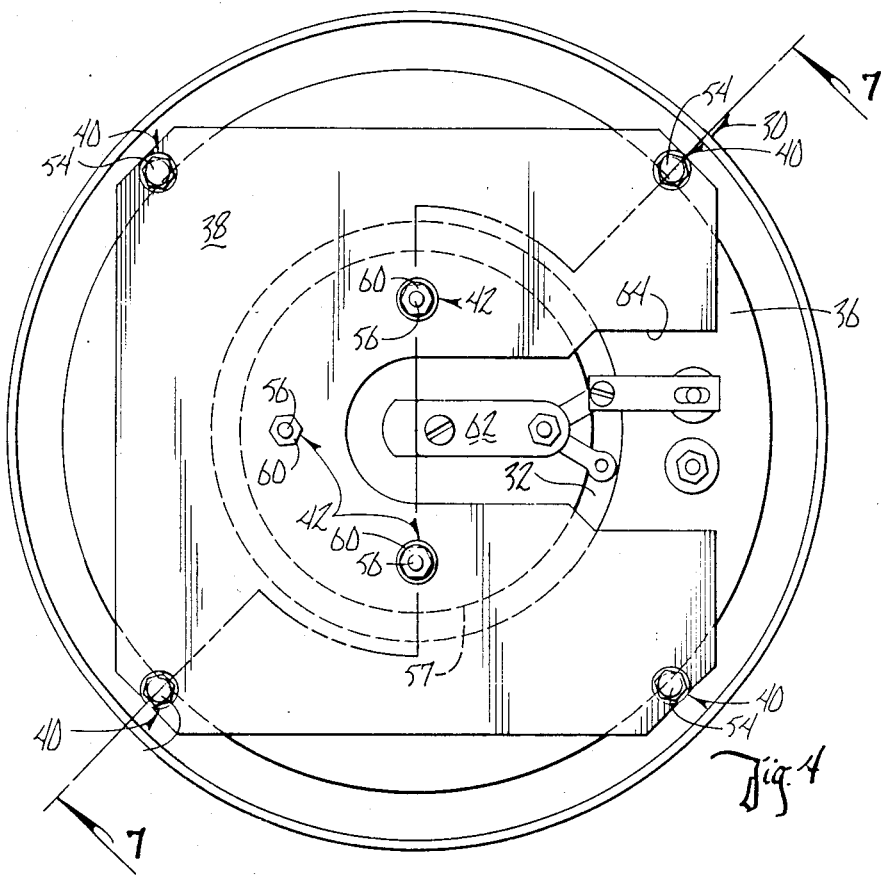
FIG. 4 is a bottom plan view of the heating kettle.
Figure 5:
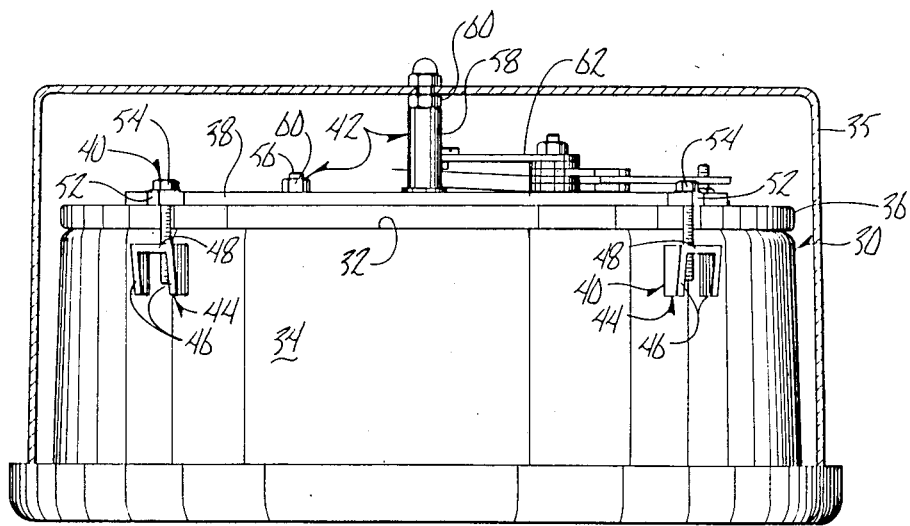
FIG. 5 is an enlarged side elevational view of the heating kettle taken along lines 5—5 of FIG. 4.

The present invention generally concerns a heating kettle 10 which is shown in the drawings and described hereinafter for use in a popping corn machine 12. However, it is understood that heating kettle 10 can be utilized in other environments without departing from the scope of the present invention. As seen in FIG. 1, corn popping machine 12 includes a three-sided panel 14 and front door 16 hingedly connected to panel 14. Machine 12 further includes a top chassis plate and a base member 20 having a perforated floor 22 therein. A lower drop-down door 24 is secured to base member 20 and a drawer 26 is slidably mounted within base member 20 for catching unpopped kernels which fall through floor 22. A plurality of switches 28 control the operation of machine 12. The general construction of machine 12 is not a part of the present invention.

Heating kettle 10 includes an aluminum pot 30 having a bottom wall 32 and a side wall 34. While bottom wall 32 of pot 30 is shown to be circular, it is understood that other shapes are possible, with side wall 34 having a complimentary shape. A steel protective sleeve 35 extends around pot 30.

Heating kettle 10 further includes a stainless steel ring-shaped heating element 36 which is held against bottom wall 32 of pot 30 by a metal hold-down plate 38. Plate 38 is 11 gauge (0.1196 inch thickness) steel with 0.10% carbon. First fastener means 40 and second fastener means 42 are used to secure hold-down plate 38 to pot 30 such that heating element 36 is securely sandwiched therebetween. As seen in the drawings, hold-down plate 38 substantially covers heating element 36 and bottom wall 32 of pot 30, and also extends beyond side wall 34 of the pot.

More particularly, first fastener means 42 includes a plurality of U-shaped brackets 44 attached to side wall 34 by welding or the like. Each U-shaped bracket 44 includes a pair of opposite legs 46 and an interconnecting web 48 having a threaded hole extending therethrough. Hold-down plate 38 has a plurality of slots or openings 52 at the perimeter edge thereof, each being adapted to receive a bolt 54 which is threadably received in hole 50 of one bracket 44 for clamping hold-down plate 38 to pot 30. Since web 48 is adjacent side wall 34, as seen in 6, bolt 54 is shaped closely to side wall 34, thereby minimizing the diameter of the kettle.

Second fastener means 42 includes a plurality of elongated bolts 56 attached to a plate 57 secured by welding or the like to bottom wall 32 of pot 30 adjacent the center thereof and extending upwardly through corresponding holes in holddown plate 38. A spacer sleeve 58 is used on bolts 56 and a nut 60 is tightened on each bolt so as to secure the central portion of hold-down plate to pot 30. Steel jacket 35 is also attached to bolts 56 by dome nuts 61. Nut 60 prevents dome nut 61 from being over-tightened, which would result in the bottom walls 32 of pot 30 becoming deformed and thereby preventing proper surface contact between bottom wall 32 and heating element 36.

Kettle 10 is also provided with a standard thermostat 62 operatively connected to bottom wall 32 of pot 30 and heating element 36 and to the appropriate switches 28. As seen in the Figures, hold-down plate 38 has a cut-out portion 64 such that the plate fits around thermostat 62. Thermostat 62 senses the temperature of bottom wall 32 of pot 30 and accordingly regulates the temperature of heating element 36 such that the bottom wall of the pot is maintained at approximately 475°–520° F.

The addition of first fastener means 40 to the conventional second fastener means 42 securely clamps heating element 36 between hold-down plate 38 and bottom wall 32 of pot 30 so as to minimize or eliminate deformation of the bottom wall and of the heating element during use of kettle 10. The strength of side wall 34 is substantially greater than the strength of bottom wall 32, with respect to the forces resulting from the first and second fastener means, respectively. This inherent strength of side wall 34 permits bolts 54 to be tightened within brackets 44 so as to exert increased clamping action against heating element 36 by hold-down plate 38, as compared to conventional heating kettles having only centrally located fasteners mounted on the bottom wall of the pot for securing the hold-down plate to the pot. Since deformation of the pot and the heating element is minimized or eliminated and the heating element is maintained in contact with the bottom wall of the pot during use of the kettle of the present invention, the pot is heated more quickly and without a great temperature differential between the bottom wall thereof and the heating element. Accordingly, burn-out of the heating element is eliminated. Furthermore, since the pot is quickly heated and maintained at the desired temperature, the popcorn kernels are heated more quickly, thereby rapidly converting the moisture therein to steam, such that the kernels are popped more quickly and more completely.

FIGS. 8 and 9 show a prior art heating kettle wherein similar elements are referenced by similar numbers. As seen in these figures, heating element 36 is secured to bottom wall of pot 30 by a pair of metal straps 68 which in turn are secured to pot 30 only in the central area of bottom wall 32. Thus, the forces across heating element 36 are not sufficient to prevent bottom wall 32 from deforming, as shown in FIG. 9. Such deformation forms gaps 70 wherein there is not contact between heating element 36 and bottom wall 32, thereby preventing complete heat transfer from element 36 to the bottom wall. Accordingly, the thermostat senses that pot 30 is not hot enough and raises the temperature of element 36 until eventually the element burns out. Then, it is possible for the heat to arc over gap 70 and burn a hole in pot 30.

Approximately 1250 watts can be supplied to heating element 36 of kettle 10, as compared to conventional kettles of this size, which typically used approximately 800 watts of power. Accordingly, kettle 10 of the present invention can be heated to the preferred temperature of 475°–500° F. in approximately three minutes, as compared to four-five minutes for conventional kettles. Thus, with the present heating kettle, corn can be popped in approximately one-half as much time as in conventional poppers, and can be popped much more completely with less unpopped kernels remaining.

From the foregoing, it is seen that the heating kettle of the present invention accomplishes at least all of the stated objectives.

What is claimed is:
1. A heating kettle, comprising:
a pot having a flat bottom wall and a side wall;
a flat rigid disc ring heating element with a central hole, said heating element being in intimate contact with the pot bottom wall to heat said pot;
a flat rigid nongrooved hold-down plate means for holding said heating element against said bottom wall of said pot;
first fastener means on said side wall of said pot for compressively securing said hold-down means to said pot such that said heating element is securely sandwiched between said hold-down means and said bottom wall of said pot and thereby held in intimate contact with said bottom wall of said pot and said hold-down plate so as to minimize deformation of said bottom wall of said pot and of said heating element during use of said kettle, and
second fastener means on said bottom wall of said pot extending through the central hole of the heating element for further securing said hold-down means to said pot such that said heating element is more securely sandwiched between said hold-down means and said bottom wall of said pot.

2. The kettle of claim 1 wherein said first fastener means includes a plurality of brackets mounted on the side wall of said pot and a plurality of bolts adapted to extend through said hold-down means and be threadably received by said brackets.

3. The kettle of claim 3 wherein said brackets are U-shaped and include a pair of opposite legs secured to said side wall of said pot and an interconnecting web having a threaded hole for receiving one of said bolts.

4. The kettle of claim 1 wherein said pot and said hold-down means are metal.

5. The kettle of claim 1 wherein said hold-down means is a plate substantially covering said heating element and said bottom wall of said pot and extending beyond said side wall of said pot for securement by said first fastening means.

6. The kettle of claim 1 wherein said kettle is for popping popcorn.

7. The kettle of claim 1 wherein said hold-down means is spaced from the bottom of the pot only by the thickness of said heating element.

* * * * *